(12) United States Patent
Burkhardt et al.

(10) Patent No.: US 8,179,129 B2
(45) Date of Patent: May 15, 2012

(54) POSITION/DISPLACEMENT MEASURING SYSTEM WITH AN ENCODED SCALE BODY

(75) Inventors: Thomas Burkhardt, Zell (DE); Ralph Bauer, Kirchheim/Neckar (DE)

(73) Assignee: BALLUFF GmbH, Neuhausen (DE)

( * ) Notice: Subject to any disclaimer, the term of this patent is extended or adjusted under 35 U.S.C. 154(b) by 414 days.

(21) Appl. No.: 12/589,509

(22) Filed: Oct. 23, 2009

(65) Prior Publication Data

US 2010/0102804 A1    Apr. 29, 2010

(30) Foreign Application Priority Data

Oct. 28, 2008   (DE) .................. 10 2008 055 680

(51) Int. Cl.
  *G01B 7/30* (2006.01)
(52) U.S. Cl. .......... 324/207.25; 324/207.11; 324/207.23
(58) Field of Classification Search .............. None
  See application file for complete search history.

(56) References Cited

U.S. PATENT DOCUMENTS

| | | | |
|---|---|---|---|
| 5,279,044 A | | 1/1994 | Bremer |
| 6,545,262 B1 | | 4/2003 | Burgschat |
| 6,813,844 B1 | | 11/2004 | Steinich |
| 2004/0174161 A1* | | 9/2004 | Tausch et al. ............ 324/207.22 |
| 2005/0060905 A1 | | 3/2005 | Novak et al. |
| 2007/0074416 A1* | | 4/2007 | Reusing ..................... 33/706 |
| 2008/0061771 A1 | | 3/2008 | Sugiyama et al. |
| 2009/0271998 A1* | | 11/2009 | Carlen et al. .............. 33/706 |

FOREIGN PATENT DOCUMENTS

| | | |
|---|---|---|
| DE | 1 930 976 | 12/1970 |
| DE | 692 22 072 | 3/1998 |
| DE | 100 28 136 | 12/2000 |
| DE | 100 52 086 | 1/2002 |
| DE | 102 10 326 | 9/2003 |
| DE | 10 2005 039 280 | 2/2007 |
| DE | 10 2005 055 905 | 5/2007 |
| DE | 10 2006 010 161 | 8/2007 |
| DE | 10 2007 008 870 | 9/2008 |
| GB | 1 319 531 | 6/1973 |

OTHER PUBLICATIONS

"Lineare Weg-und Abstandssensoren" (Linear Displacement and Distance Sensors), Thomas Burkhardt, Albert Feinäugle, Sorin Fericean, Alexander Forkl, Verlag moderne Industrie, Die Bibliothek der Technik, vol. 271, Munich 2004, chapter "Wegsensoren mit magnetisch kodiertem Maßköerper", 4 pages.

* cited by examiner

*Primary Examiner* — Minh N Tang
(74) *Attorney, Agent, or Firm* — Lipsitz & McAllister LLC

(57) ABSTRACT

Position/displacement measuring system, comprising a sensor head and an encoded scale body, the scale body extending in a first direction and in a second direction lying transversely to the first direction, and the scale body having a region for incremental position determination with an encoding in the first direction and a region for absolute position determination with an encoding in the second direction, the sensor head having a first sensor device with a sensor resolution parallel to the first direction, which is associated with the region for incremental position determination, and the sensor head having a second sensor device with a sensor resolution in a second direction, which is associated with the region for absolute position determination.

27 Claims, 10 Drawing Sheets

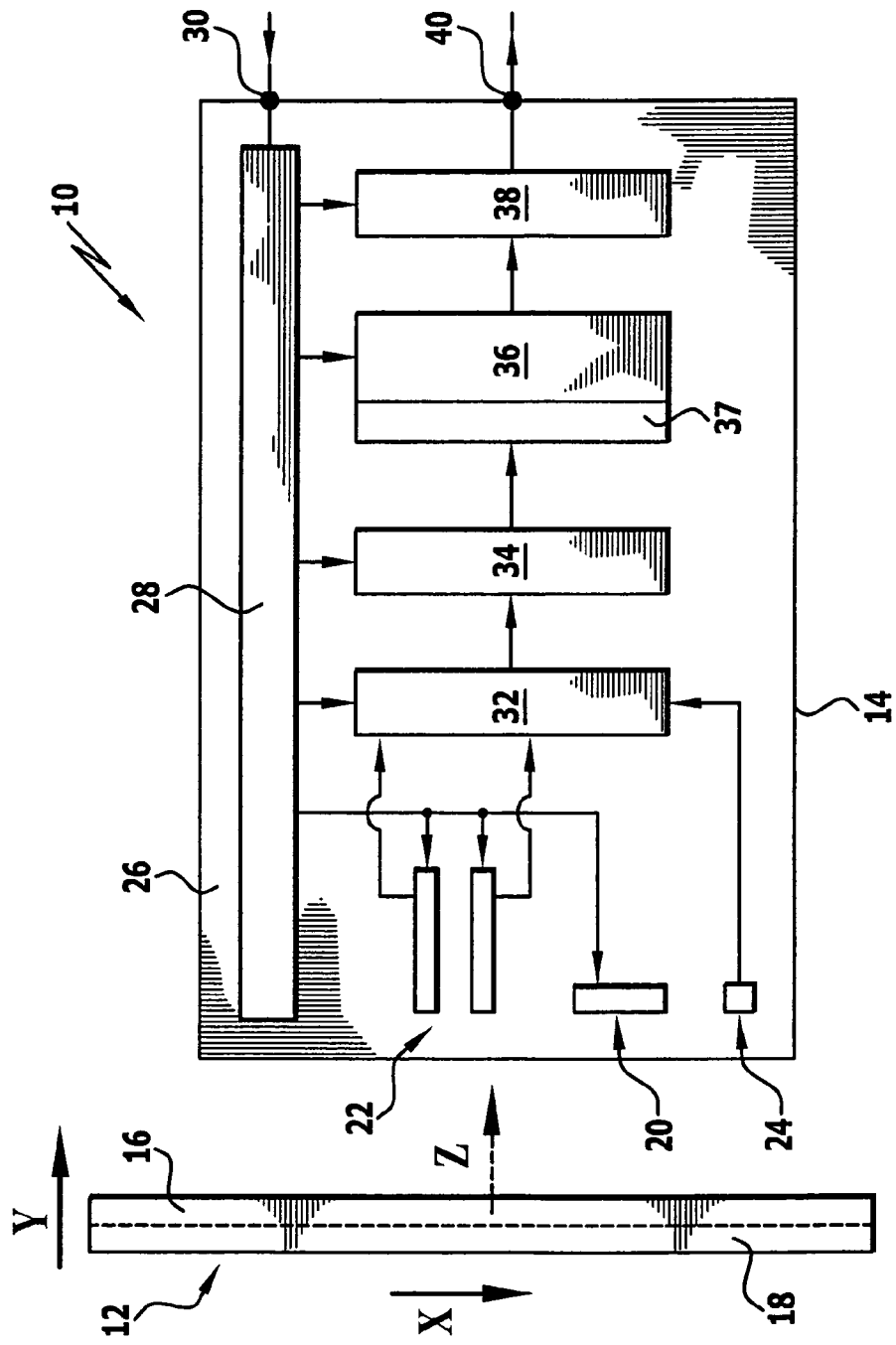

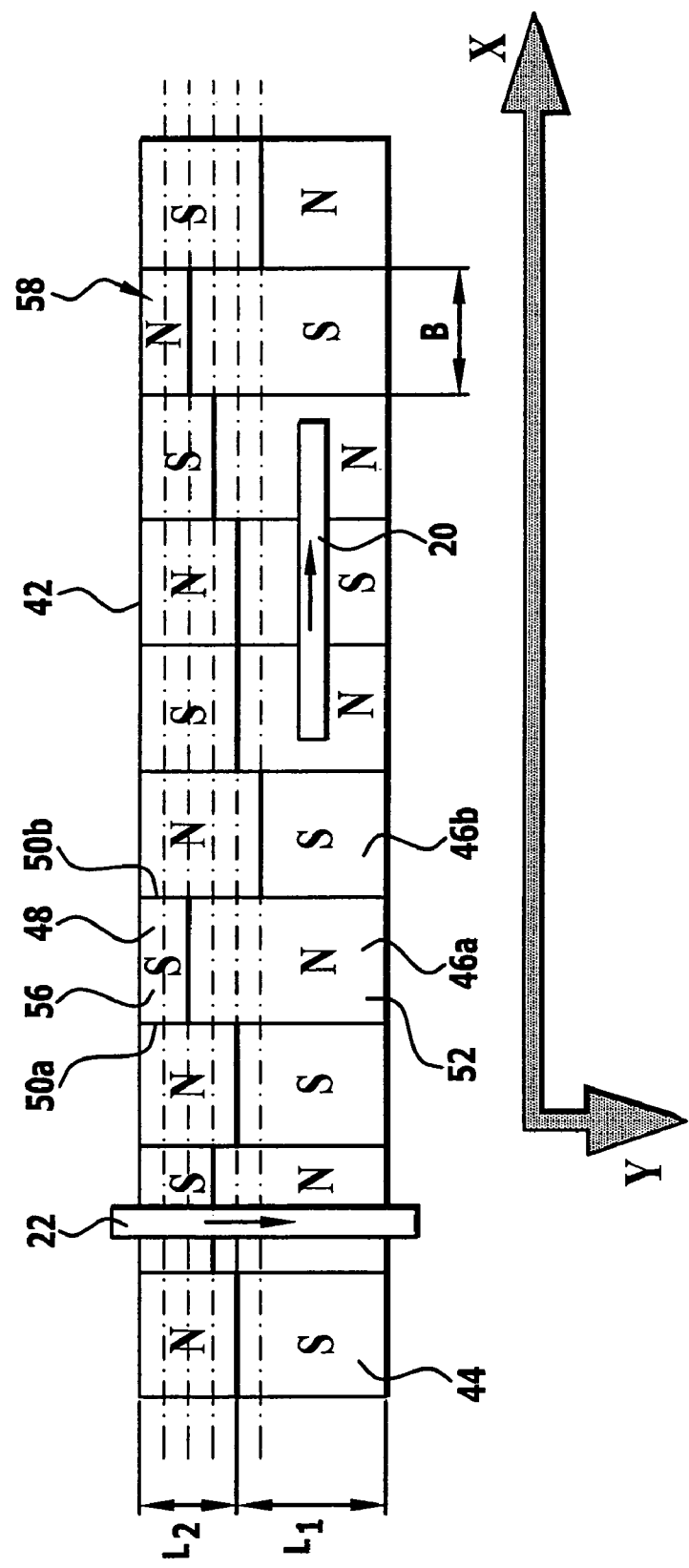

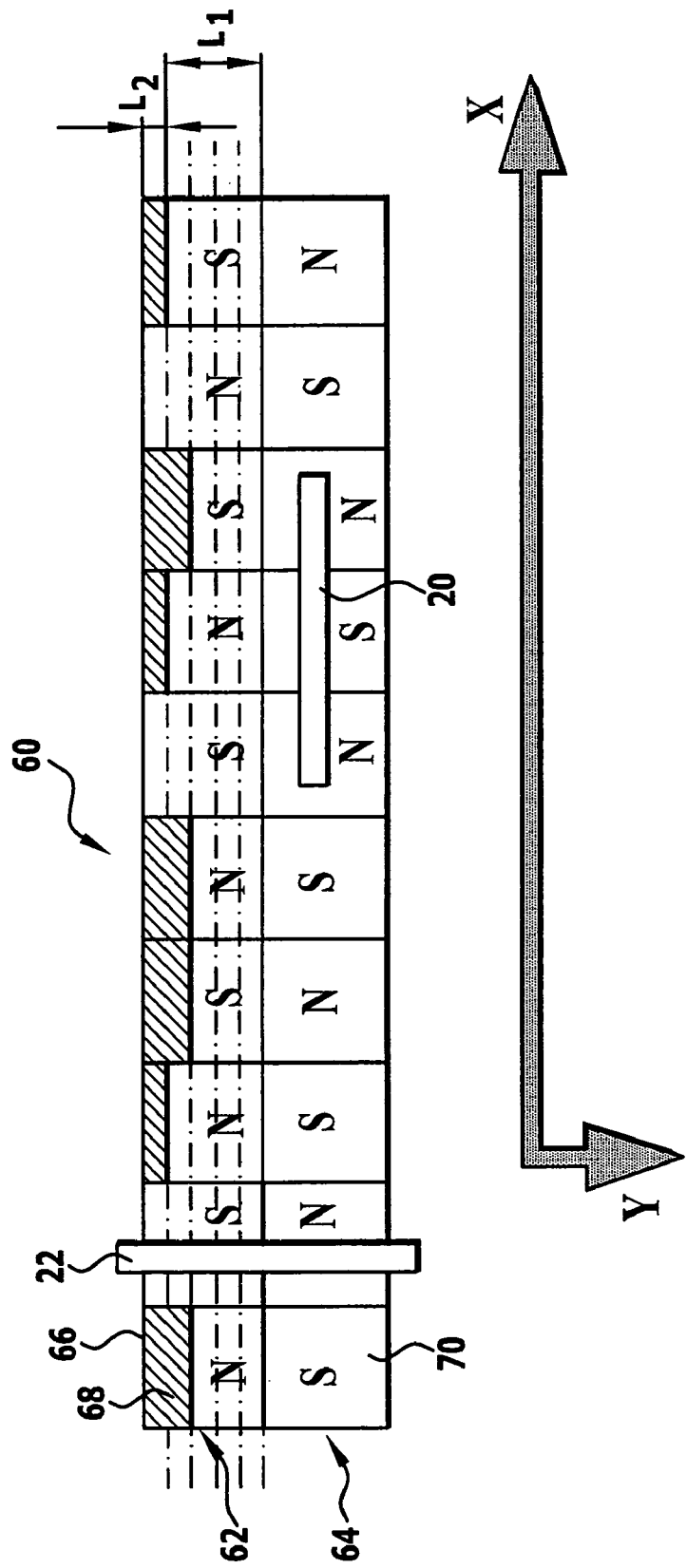

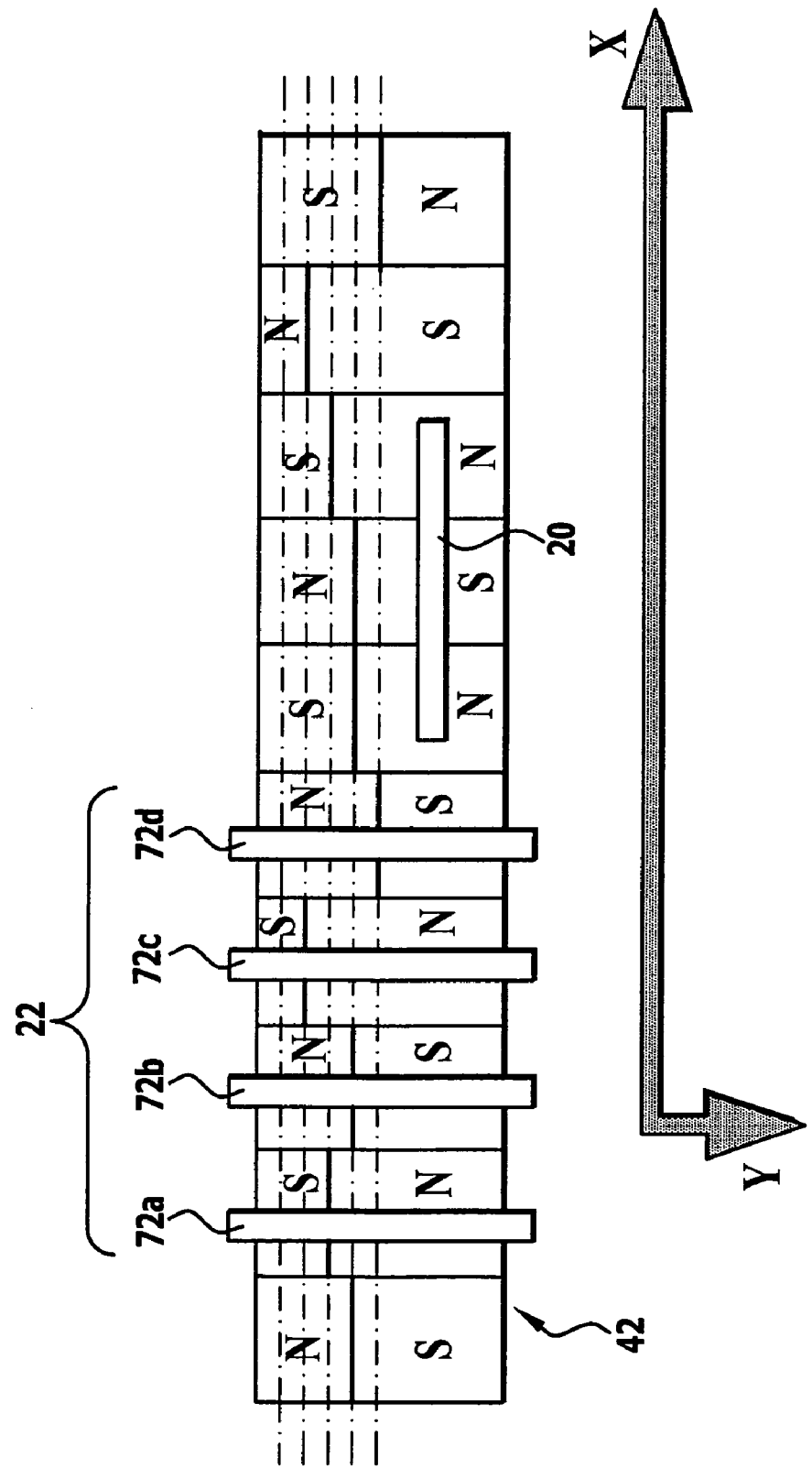

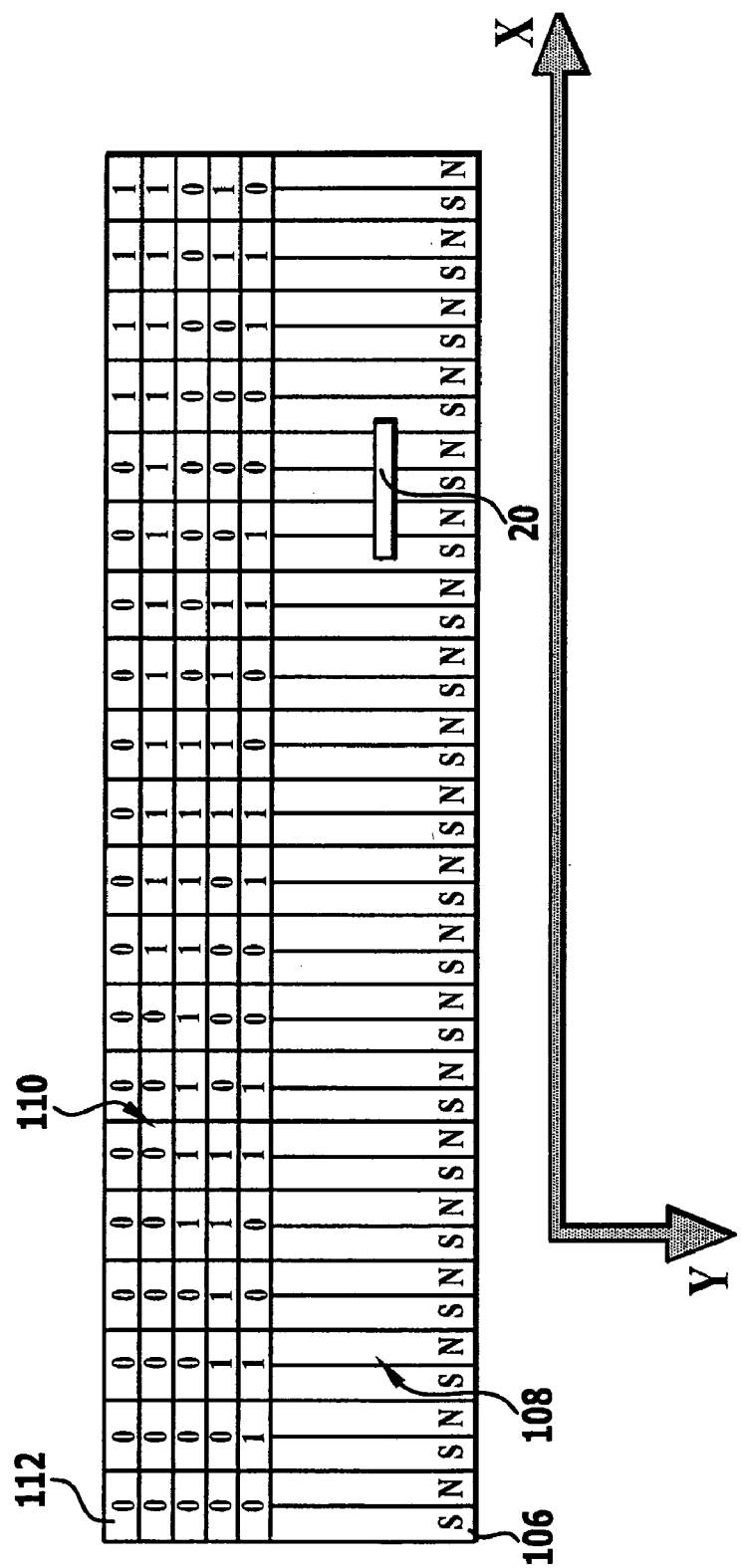

POSITION/DISPLACEMENT MEASURING SYSTEM WITH AN ENCODED SCALE BODY

The present disclosure relates to the subject matter disclosed in German application number 10 2008 055 680.7 of Oct. 28, 2008, which is incorporated herein by reference in its entirety and for all purposes.

BACKGROUND OF THE INVENTION

The invention relates to a position/displacement measuring system, comprising a sensor head and an encoded scale body. The scale body extends in a first direction and in a second direction lying transversely to the first direction and comprises a region for absolute position determination and a region for incremental position determination with an encoding in the first direction.

Displacement sensors with magnetically encoded scale body are described in the book "Lineare Weg- and Abstandssensoren" (Linear Displacement and Distance Sensors) by T. Burkhardt, A. Feinäugle, S. Fericean and A. Forkl, Verlag Moderne Industrie, Die Bibliothek der Technik, volume 271, Munich 2004.

The magnetic lines of field which originate from the scale body form a three dimensional vector field. The sensor head moves above the scale body in this field.

The sensor head contains magnetic field-sensitive sensors which measure either the component of the magnetic field vector in the first direction or the angle of the magnetic vector field to the first direction.

SUMMARY OF THE INVENTION

In accordance with the present invention, a position/displacement measuring system is provided, which, in particular, has increased accuracy.

In an embodiment of the invention, the region for absolute position determination has an encoding in a second direction, and the sensor head has a first sensor device with a sensor resolution parallel to the first direction, which is associated with the region for incremental position determination, and a second sensor device with a sensor resolution in the second direction, which is associated with the region for absolute position determination.

The region for absolute position determination is used to determine an absolute position of the sensor head, the resolution being limited. Starting from the determined absolute position, the region for incremental position determination is used to determine an increased resolution, in particular, by analog displacement measurement or position measurement, in order to achieve an absolute position with high resolution. An absolute system with increased accuracy is thereby provided.

In the solution according to the invention, an encoding in the second direction is also provided. The absolute position can thereby be determined by means of the corresponding sensor resolution of the second sensor device in the second direction. Starting from this absolute position, the absolute position of the sensor head relative to the scale body can be determined with high accuracy by additional evaluation of an incremental position in the first direction.

In the region for absolute position determination, a plurality of (different) pole fields (a pole field corresponds to a bit) can be encoded in the second direction in relation to a width in the first direction. It is thereby possible to keep the number of sensors required in the sensor head low. A sensor head with a smaller housing is thereby achieved. The sensor head and hence the system can be manufactured and assembled more cost-effectively, and a higher reliability is obtained.

If fewer sensors are required, these can also be arranged on a shorter length in the first direction. In turn, greater angle tolerance for assembly about an axis perpendicular to the scale body is thereby obtained. Since fewer sensors are required, the assembly expenditure is reduced. Assembly tolerances can be more easily compensated in a calibration step.

Since, in turn, fewer sensors are required, absolute detection of larger lengths in the first direction is possible.

The aforementioned advantages can be achieved without the length of the scale body in the second direction having to be increased.

It is, in principle, also possible to measure an offset or a rotation of the sensor head relative to the scale body.

In the solution according to the invention, in addition to a "parallel" measurement by the first sensor device, an "orthogonal" measurement is made by the second sensor device, in order to determine the absolute position. Accordingly, a magnetic encoding is provided in the second direction, and this encoding varies owing to corresponding distribution of pole fields in the first direction. The sensor resolution in the first direction or second direction corresponds to a measurability of the corresponding sensor device in the respective direction.

The encoding can, for example, be magnetic and/or inductive and/or capacitive and/or optical, and the first sensor device and the second sensor device are then correspondingly configured and have a magnetic field resolution as sensor resolution and/or inductive resolution in the case of inductive encoding and/or charge resolution in the case of capacitive encoding and/or optical resolution in the case of optical encoding. A magnetic encoding can be achieved in a simple way by corresponding magnetized regions.

In particular, the scale body comprises pole fields of a first type and a second type, with the arrangement and distribution of the pole fields determining the way in which the position/displacement measuring system operates. The first type differs from the second type, and this difference is recognizable by the sensor devices. In a magnetic encoding, the first type is, for example, the north pole type, and the second type is the south pole type.

The sensor head is spaced from the scale body in a third direction lying transversely and, in particular, perpendicularly to the first direction and transversely and, in particular, perpendicularly to the second direction. A contactless measuring system with an air gap between the sensor head and the scale body is thereby achieved with the encoding.

In particular, the first direction is a measuring direction for the displacement/position determination of the sensor head relative to the scale body.

Advantageously, pole fields of a different type are arranged alternately in the region for incremental position determination. Starting from a determined absolute position (determined by means of the region for absolute position determination), the resolution can thus be increased by an, in particular, analog displacement/position measurement at the region for incremental position determination.

In principle, the region for absolute position determination and the region for incremental position determination are arranged next to each other or are combined with each other in the second direction. For example, the region for absolute position determination and the region for incremental position determination form tracks lying in parallel next to each other. It is, in principle, also possible by way of a combination, for, for example, a pole field of the region for incremental position determination to merge into a pole field of the region for absolute position determination.

It can be provided that pole fields of the region for incremental position determination and pole fields of the region for absolute position determination are arranged (with or without spacing) next to one another in the second direction. In principle, it is, however, also possible for a non-encoded region (for example, non-magnetic) and hence a spacing to be present between these pole fields. An encoding in the second direction can be effected by corresponding formation of the length of this non-encoded region in the second direction.

In particular, one or more pole fields of the region for incremental position determination and one or more pole fields of the region for absolute position detection are arranged in a strip, and the scale body comprises a plurality of strips arranged next to one another in the first direction. A region for incremental position determination and a region for absolute position determination with an encoding in the first direction and an encoding in the second direction can thereby be created in a simple way.

It is expedient for (real or imaginary) strip delimiting lines lying opposite one another in the first direction to extend parallel to one another. This results in a simple evaluatability.

In an embodiment, a strip comprises a first pole field and a second pole field, with the ratio of the length of the second pole field to the length of the first pole field in the second direction varying for different strips. An encoding in the second direction can thereby be effected in a simple way.

In particular, the first pole field and the second pole field are of different types (such as opposite magnetic polarity) in order to provide a corresponding encoding (such as magnetic encoding).

It is advantageous for the different lengths to be formed in discrete steps. An encoding can thereby be achieved in a simple way, and this encoding can be produced in a simple way.

In an embodiment, the first pole field, which forms at least partially the region for incremental position determination, has different lengths for different strips. Alternatively, it is possible for the first pole field and the second pole field to have the same length for all strips.

In an embodiment, a strip has non-encoded regions. By corresponding arrangement and/or length formation of the non-encoded regions in the second direction for different strips, an encoding can be formed, if this arrangement or these lengths vary accordingly.

It is also possible for a strip to comprise a plurality of pole fields of different polarity, and in different strips these pole fields are arranged in different positions in the second direction, and these pole fields form at least partially the region for absolute position determination. An encoding can thereby be formed by the region for absolute position determination having a plurality of pole fields. In such a configuration, it is, for example, also possible in a simple way, by means of corresponding signal evaluation, if a plurality of sensors are provided, to detect a rotation or a tilting of the sensor head.

It is possible for a strip to comprise pole fields of a different type (such as different magnetic polarity), which are arranged one after another in the first direction. These pole fields form, in particular, pole fields of the region for incremental position determination.

It is also possible for a digital encoding to be formed by the pole fields of the region for absolute position determination by means of distribution of pole fields of the first type and the second type. A pole field of the first type is associated with a digit (for example, 0) and a pole field of the second type is associated with a digit (for example, 1). The sequence of the pole fields then produces a digital encoding, for example, of a strip in which the pole fields are arranged. The digital encoding can be read by means of the second sensor device, and if different strips have a different digital encoding, the absolute position can thereby be determined with limited resolution (prescribed by the pole width).

In particular, the second sensor device is configured such that in a second direction n different steps corresponding to an arrangement and/or distribution of pole fields are recognizable. The encoding can therefore be read by the second sensor device, and, in turn, the absolute position can thereby be determined (with limited resolution).

It is, in principle, possible for the second sensor device to comprise a plurality of sensors. A plurality of sensors can be provided for reading a corresponding code (such as a magnetic code).

To this end, in an embodiment a plurality of sensors are spaced in the first direction. The encoding can thereby be read accordingly in the second direction.

It is alternatively or additionally possible for a plurality of sensors to be arranged in a row which extends parallel to the second direction. One sensor is then associated with a certain pole field region, and it is determined by means of this sensor whether a pole field is of the first type (such as north pole) or of the second type (such as south pole). A corresponding code such as, for example, a digital code can thereby be read.

It is advantageous for the spacing between adjacent sensors in the first direction to be greater or smaller than a pole field width of pole fields in the first direction. The spacing between adjacent sensors is therefore incommensurable to the arrangement of pole fields. The corresponding spacing between adjacent sensors prevents all of the sensors from being able to lie between adjacent pole fields. This increases the accuracy of the measurement. Alternatively, the sensors can also be positioned in pairs with an angular displacement of the sensors in a pair in relation to the orthogonal pole pitch. A preferred angular displacement is 180°.

For the measuring resolution in the second direction, the second sensor device can comprise at least one row of sensors which are arranged adjacent to one another in the second direction, and/or comprise at least one sensor which determines magnetic field angles (in the case of magnetic encoding) and/or comprise at least one analog displacement/position sensor which determines a displacement or a position in the second direction. The encoding in the second direction can thereby be read in order to determine the absolute position.

The first sensor device can comprise at least one analog displacement/position sensor for determining a displacement or a position in the first direction, so as to correspondingly enable determination of the absolute position, starting from a previously determined absolute position, with increased resolution.

In principle, a third sensor device can also be provided, which has a sensor resolution in a third direction transverse to the first direction and transverse to the second direction. Tiltings, for example, can thereby be recognized.

The following description of preferred embodiments serves in conjunction with the drawings to explain the invention in greater detail.

BRIEF DESCRIPTION OF THE DRAWINGS

FIG. 1 shows a diagrammatic representation of an exemplary embodiment of a position/displacement measuring system according to the invention with a scale body and a sensor head;

FIG. 2 shows a diagrammatic representation of a first exemplary embodiment of a position/displacement measuring system according to the invention;

FIG. 3 shows a diagrammatic representation of a second exemplary embodiment of a position/displacement measuring system according to the invention with a scale body and a sensor head;

FIG. 4(a) shows a diagrammatic representation of a third exemplary embodiment of a position/displacement measuring system according to the invention with a scale body and a sensor head;

FIG. 10 shows a diagrammatic representation of a ninth exemplary embodiment of a position/displacement measuring system according to the invention.

DETAILED DESCRIPTION OF THE INVENTION

Figure 4B:
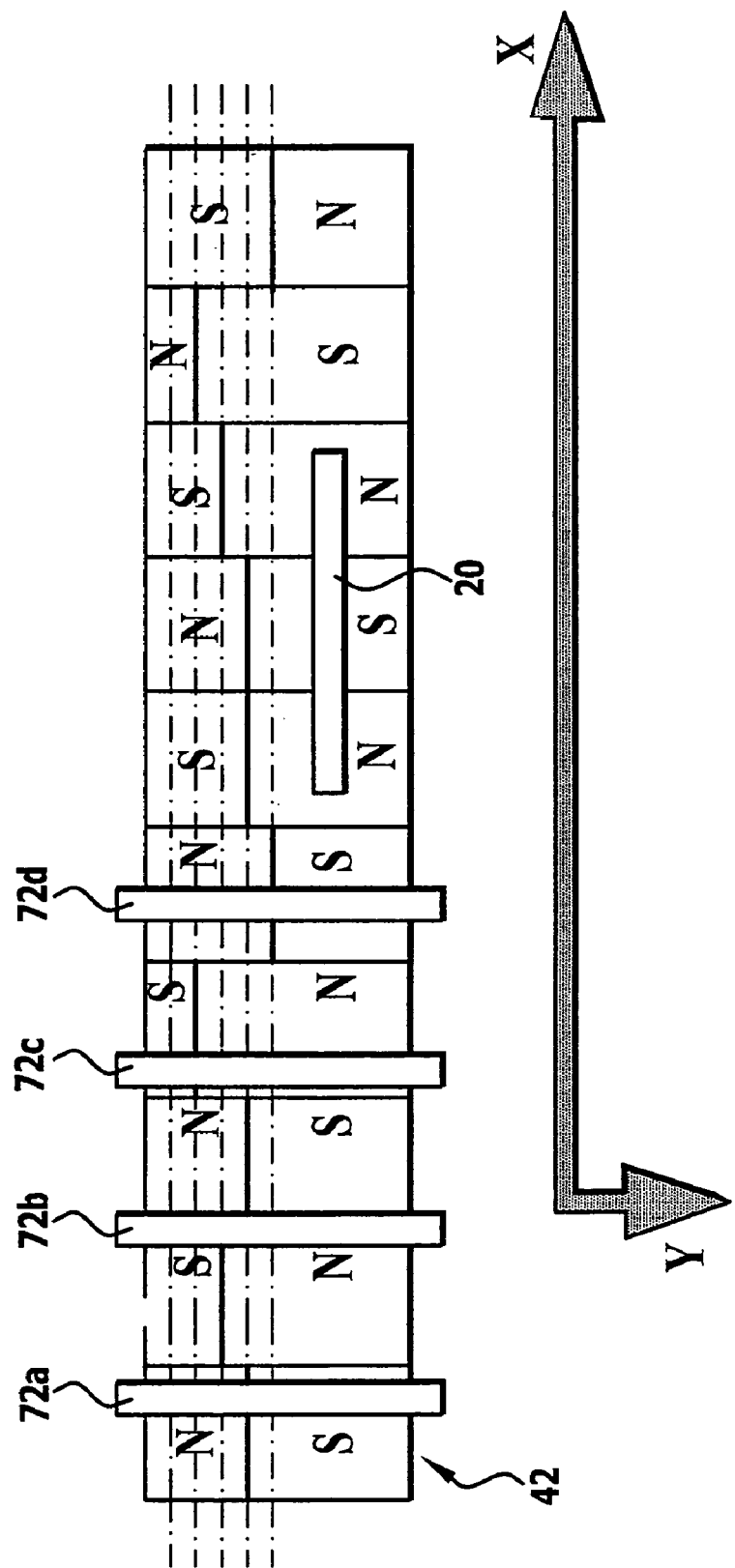
FIG. 4(b) shows a diagrammatic representation of a variant of a third exemplary embodiment of a position/displacement measuring system according to the invention with a scale body and a sensor head.

An embodiment of a position/displacement measuring system according to the invention, which is shown diagrammatically in FIG. 1 and denoted therein by 10, comprises a scale body 12 which is magnetically encoded. The scale body 12 itself comprises a support on which the magnetic encoding is arranged. The magnetic encoding is formed, for example, by a plastic band which is flexible and magnetizable. The encoding of the scale body 12 is effected by a corresponding alternating arrangement of pole fields of the north pole type and pole fields of the south pole type.

The magnetic field lines of these pole fields form a three-dimensional vector field. A sensor head 14 is arranged in this field.

The scale body 12 extends in a first direction x and in a second direction y, which is transverse and, in particular, perpendicular to the first direction. The first direction x is a measuring direction in which the position or the displacement of the sensor head 14 relative to the scale body 12 is determinable. The sensor head 14 is spaced in a third direction z from the scale body 12, the third direction being transverse and, in particular, perpendicular to the first direction x and transverse and, in particular, perpendicular to the second direction y.

As will be explained in greater detail hereinbelow, the scale body 12 comprises a region for absolute position determination 16, which is magnetically encoded in a corresponding manner, and a region for incremental position determination 18, which is also encoded in a corresponding manner. By means of the region for absolute position determination 16, the absolute position of the sensor head 14 can be determined in the direction x on the scale body 12, the resolution being limited. The region for incremental position determination 18 serves to magnify the resolution.

The sensor head comprises a plurality of sensors. In the solution according to the invention, the sensor head 14 comprises a first sensor device 20 with one or more sensors, which have a magnetic field resolution in the first direction x. The first sensor device 20 is associated with the region for incremental position determination 18.

The sensor head 14 further comprises a second sensor device 22 with one or more sensors, which have a magnetic field resolution in the second direction y. The second sensor device 22 is associated with the region for absolute position determination 16.

A third sensor device 24 can be provided, which has a magnetic field resolution in the third direction z. For example, tiltings of the sensor head 14 relative to the scale body 12 can be detected by the third sensor device 24.

The sensor devices 20, 22, 24 are arranged in a housing 26. A power supply device 28 for the sensor devices 20, 22, 24 is positioned in the housing 26. Associated with the power supply device 28 are one or more external connections 30 for an external power supply. A power source arranged on the sensor head 14 or a receiving device for wireless power supply can also be optionally associated with the power supply device 28.

The sensor devices 20, 22, 24 are followed by an amplifier 32, which is also positioned in the housing 26. The sensor devices 20, 22, 24 feed their signals to the amplifier 32, in which they are amplified.

It is also possible for the amplifier 32 to be followed by an A/D converter 34, which converts analog signals of the sensor devices to digital signals.

It is, in principle, also possible for one or more sensor devices to already provide digital signals. In this case, no A/D converter 34 is required.

The amplified and, where necessary, converted signals are fed to an evaluation device 36. In particular, this is formed by a microcontroller (or ASIC or DSP, etc.). It can also include an interpolator 37.

The evaluation device 36 feeds the corresponding signals to a signal matching device 38, and these signals can be tapped at an output 40 of the sensor head 14. In doing so, wireless signal transmission or line transmission of corresponding evaluation signals can take place.

A first embodiment of a position/displacement measuring system according to the invention comprises a scale body 42 (FIG. 2). The scale body 42 comprises a region for incremental position determination 44. The region for incremental position determination 44 comprises pole fields 46a of the north pole type and pole fields 46b of the south pole type. These pole fields are arranged alternately in the first direction x. Adjacent pole fields 46a, 46b have a different polarity and next but one pole fields have the same polarity.

The pole fields 46a, 46b have a width B in the first direction x. The pole fields 46a, 46b of the region for incremental position determination 44 form an incremental track, all pole fields 46a, 46b of the region for incremental position determination 44 having the same width B.

A magnetic encoding is formed by the alternating arrangement of the pole fields 46a, 46b.

The respective pole fields 46a, 46b are arranged in a respective strip 48. The strips 48 extend in the second direction y and have opposed (imaginary) strip delimiting lines 50a, 50b, which are spaced in the first direction x and are aligned parallel to the second direction y.

The respective strips 48 comprise a first pole field 52, which is the corresponding pole field 46a or 46b of the region for incremental position determination 44, and a second pole field 56, which is associated with a region for absolute position determination 58. The second pole field 56 has a polarity that is opposite to that of the first pole field 52. The first pole field 52 and the second pole field 56 together form the region for absolute position determination 58.

The first pole field 52 has a length $L_1$ in the second direction y, and the second pole field 56 of a strip 48 has a length $L_2$ in the second direction y. The length $L_1$ of the first pole field 52 is, for example, at least 50% of the total length $L_1+L_2$ of a strip 48. The region for incremental position determination 44 is formed by the 50% length of the first pole field 52. The remaining "residual length" (including the residual length zero) contributes towards formation of the region for absolute position determination 58.

The ratio of length $L_2$ to $L_1$ varies in different strips. A magnetic encoding is formed in the second direction y by this variation in length.

In particular, the variation in length of $L_1$ and hence also of $L_2$ is formed discretely and occurs in discrete steps. For example, n discrete steps are provided therefor. The second pole field 56 can therefore have n different lengths from $L_2=0$ to $L_2=n$ times the length of an individual step in the second direction y.

The second sensor device 22 has a magnetic field resolution in the second direction y. If different strips 48 have a different pole field formation with respect to the lengths $L_1$ and $L_2$, it is then possible to detect by means of the second sensor device 22 which special strip is present, and absolute position determination can thereby be carried out.

The overall resolution can be improved by the first sensor device 20 by means of the magnetic field resolution in the first direction x by an incremental measurement being carried out at the pole fields 46a, 46b. The absolute position is determined in accordance with pole number·pole width (in the region for absolute position determination 58)+incremental position.

The magnetic field detection in the second direction y by means of the second sensor device 22 can take place in various ways. For example, the second sensor device 22 comprises a plurality of sensors arranged in a row in the second direction y. For the region for absolute position determination 58, these sensors are correspondingly directed towards a possible sub-width i.e., directed towards a step. If the second pole fields 56 are divided into n possible steps, then one row comprises (at least) n sensors, which are correspondingly directed. These sensors can then provide a digital signal, for example.

It is also possible for the second sensor device 22 to comprise (at least) one magnetic field-sensitive sensor, which can determine magnetic field angles and thereby has a magnetic field resolution in the second direction y for obtaining, in turn, an absolute position determination in accordance with the encoding of the strips 48.

It is, in principle, also possible for the second sensor device 22 to comprise (at least) one magnetic field-sensitive sensor, which enables an analog displacement determination or position determination in the second direction y and thereby enables a corresponding magnetic field resolution in the second direction y.

The first sensor device 20 and the second sensor device 22 are arranged in a sensor head. This sensor head is not shown in its entirety in FIG. 2.

The first sensor device 20 comprises, for example, an analog magnetic field-sensitive displacement/position sensor, which has a corresponding resolution in the first direction x, in order to enable by way of the incremental position, starting from the absolute position determined by means of the region for absolute position determination 58 at the second sensor device 22, a higher resolution for the position determination or displacement determination of the sensor head 14 on the scale body 42.

The first sensor device 20 comprises, for example, a first magnetic field sensor and a second magnetic field sensor, which emit signals that are phase-shifted through 90°. Such magnetic field sensors are also referred to as sine sensor and cosine sensor.

In the solution according to the invention, there is provided in addition to the first sensor device 20 and the sensor head 14 at least one orthogonal sensor of the second sensor device 22, by means of which a magnetic encoding in the direction transverse to the first direction x, namely in the second direction y, can be evaluated. The absolute position signal is contained in this "transverse encoding" through the encoding for the number of the present pole.

The second pole fields 56 of the region for absolute position determination 58 form an absolute track. In the embodiment shown in FIG. 2, this absolute track lies directly adjacent to the incremental track without any spacing between these.

At each increment of the incremental track in the first direction x several bits n can be encoded in the absolute track in the second direction y. In principle, the number of sensors required can thereby be reduced. With n bits and m sensors, $n^m$ unambiguous values can be represented through these sensors. In particular, n is greater than 2.

With a higher basis than 2 (n greater than 2) fewer sensors are required for a certain length. The housing of the sensor head 14 can thereby be reduced in size. Fewer sensors allow the position/displacement measuring system 10 to be manufactured more cost-effectively, and a higher reliability is also achieved.

If fewer sensors are arranged on a shorter length, a greater angle tolerance is permissible with assembly about an axis perpendicular to the scale body 12. The assembly expenditure is reduced. It is also easier to compensate for assembly tolerances in a calibration step.

Absolute detection of greater lengths in the first direction x is also possible as fewer sensors are required.

The width of the scale body 12 in the second direction y need not be increased. For example, a width in the second direction y of 10 mm is adequate.

In principle, it is even possible to detect an offset of the housing 26 of the sensor head 14 in relation to the scale body 12 by measurement (with several sensors). A rotation of the sensor head 14 about an axis parallel to the third direction z is also possible.

In a second embodiment shown diagrammatically in FIG. 3, a scale body 60 is provided, which comprises a region for absolute position determination 62 and a region for incremental position determination 64. The region for absolute position determination 62 and the region for incremental position determination 64 are arranged in parallel adjacent to each other without any spacing between them. The region for incremental position determination 64 comprises pole fields with alternating polarity, the pole fields having the same width in the first direction x and the same width in the height y.

The region for absolute position determination 62 comprises pole fields 66, which have a different length in the second direction y. Non-magnetic regions 68 are arranged next to some pole fields (such as, for example, pole field 66) in the region for absolute position determination 62. Pole fields 66 have a length $L_1$ in the second direction y. The non-magnetic regions 68 have a length $L_2$ in the second direction y. Different strips formed by a pole field 70 of the region for incremental position determination 64 and by the adjacent pole field 66 in the second direction y have a varying length ratio $L_2$ to $L_1$. A magnetic encoding is thereby formed in the second direction y.

The pole field 66 of a strip 70 has an opposite polarity to that of the corresponding pole field of the region for incremental position determination 64.

In the embodiment shown, the non-magnetic regions 68, if a corresponding strip 70 has such a non-magnetic region 68, are arranged at an outer edge facing away from the region for incremental position determination 64.

It is, in principle, also possible for the non-magnetic regions 68 to be distributed between the outer edge and the pole fields of the incremental track.

The length $L_1$ of the pole fields 66 in the region for absolute position determination 62 and the length $L_2$ of the non-magnetic regions 68 are "quantized" in n steps.

The magnetic encoding in the second direction y results from the distribution and variation in length of the pole fields 66 and of the non-magnetic regions 68 in the region for absolute position determination 62.

In other respects, the position/displacement measuring system operates as described hereinabove.

In principle, the second sensor device 22 can comprise a plurality of sensors 72a, 72b, etc. spaced in the first direction x or rows of sensors spaced in this first direction x (FIGS. 4(a), 4(b)). With m sensors 72a, 72b, etc., if the region for absolute position determination 58 has n steps, this results in an encodability of $m^n$ pole fields.

In the embodiment according to FIG. 4(a), which comprises the scale body 42 and in which five steps are provided in the region for absolute position determination 58, if four sensors 72a, etc. of the second sensor device 22 are used, $4^5=1024$ pole fields can be encoded.

In principle, it is such that at the point in time at which the position/displacement measuring system 10 is switched on, the absolute position should be recognized at each position. If a sensor of the second sensor device 22 is located exactly between adjacent pole fields and, in particular, when a number of sensors 72a, 72b are present, all sensors are located between adjacent pole fields, this is then not possible. It is therefore advantageous for a spacing between the sensors 72a, 72b to be incommensurable to the pole field period in the first direction x. In particular, to this end, the spacing between adjacent sensors 72a, 72b, etc. is greater than a pole field width B in the first direction x.

It is also possible to provide a second row of sensors, which is offset from the first row by half of a pole width. Then either the first row is arranged exactly at the center between the poles, or the second row is thus arranged. The row at the center must not be used to determine the pole number. The decision as to which row is valid can only be taken by a corresponding incremental sensor which knows the position in the pole.

In the embodiment shown in FIG. 4(b), the sensor 72b does not recognize a correct signal at the switching-on time as it is located exactly between two adjacent pole fields. Its corresponding signal must not be taken into account in the evaluation. From the first sensor device 20, which provides corresponding signals, the evaluation device 36 knows which sensor of the second sensor device 22 must not be taken into account in the position determination. Errors resulting from sensors which must not be taken into account in the evaluation are thereby avoided.

In the position/displacement measuring system with the scale bodies 42 and 60, each strip 48 comprises exactly two pole fields with different polarity. The length of the corresponding second pole field 56 or of the pole field 66 in the second direction y can then vary for formation of a magnetic encoding in the second direction y. In the scale body 60 non-magnetic regions 68 are additionally provided.

It is, in principle, also possible for a strip to comprise a plurality of pole fields for formation of a region for absolute position determination.

In a fourth embodiment of a position/displacement measuring system 10 according to the invention (FIG. 5), a scale body 75 is provided with a region for incremental position determination 74, which comprises pole fields 76, which are arranged with alternating polarity in the first direction x. A strip 78 is formed, which comprises pole fields 76a and 76b, which lie adjacent to one another without any spacing between them in the first direction x and have opposite polarity.

The strip 78 further comprises pole fields 80a, 80b, etc., which follow the pole fields 76a, 76b in the second direction y and thereby form a region for absolute position determination 82.

A width of a pole field 80a, 80b, etc. in the first direction y corresponds, in particular, to the added width of pole fields 76a, 76b in the strips 78.

The pole fields 80a, 80b follow one after the other with alternating polarity in the second direction y.

The arrangement of the pole fields 80a, 80b can vary between different strips 78, in order to correspondingly form the magnetic encoding for the region for absolute position determination 82.

Figures 5, 6:
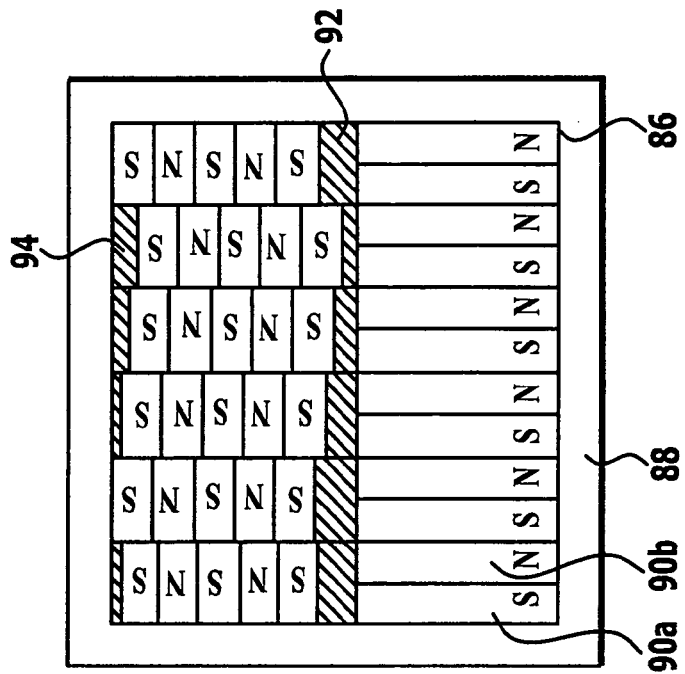
FIG. 5 shows a diagrammatic partial representation of a scale body of a fourth exemplary embodiment.
FIG. 6 shows a partial representation of a scale body of a fifth exemplary embodiment.

In the embodiment according to FIG. 5, all pole fields 76a, 76b of the strips 78 have the same length in the second direction y. A length of a first pole field 80a, which directly contacts the pole fields 76a, 76b, can, in particular, vary in discrete steps for different strips 78; the length then relates to the second direction y. The variation in position (variation of location) in the second direction y occurs stepwise.

Depending on the length of the corresponding pole field 80a in the second direction y, a non-magnetized region 84 lies at the edge. The length of such a non-magnetized region 84 in the second direction y depends on the length of the first pole field 80a. The length of the first pole field 80a and the length of the non-magnetized region 84 per strip add up to the length of the nearest pole field 80b in the second direction y.

In a fifth embodiment shown diagrammatically in FIG. 6, a scale body 86 is provided, which comprises strips 88. A strip 88 comprises pole fields 90a, 90b of opposite polarity lying directly adjacent to one another in the first direction x. These pole fields 90a, 90b are followed in the second direction y by a non-magnetic region 92. This non-magnetic region is followed by pole fields 94 of a region for absolute position determination, and these can be of the same length in the second direction y. The pole fields 94 can be followed in the second direction y by a further non-magnetic region.

The position (location) of the non-magnetic region 92, which follows the pole fields 90a, 90b in the second direction y, can vary, in particular, in discrete steps, in different strips 88. The magnetic encoding is thereby achieved in the second direction y.

The corresponding pole fields 80a, 80b, etc. and 94, respectively, can, for example, be produced by the scale body first being magnetized with the pole fields 76a, 76b and 90a, 90b, respectively, and by a second division then being applied (now in the second direction y) in a further procedural step.

In the fourth embodiment and the fifth embodiment according to FIGS. 5 and 6, the pole fields 76a, 76b and 90a, 90b, respectively, of the respective region for incremental position determination have the same length in the second direction y. (The pole fields 80*a*, 80*b* can have a different (such as, for example, a smaller) length in the second direction y than the pole fields 76*a*, 76*b*.)

Figure 7:
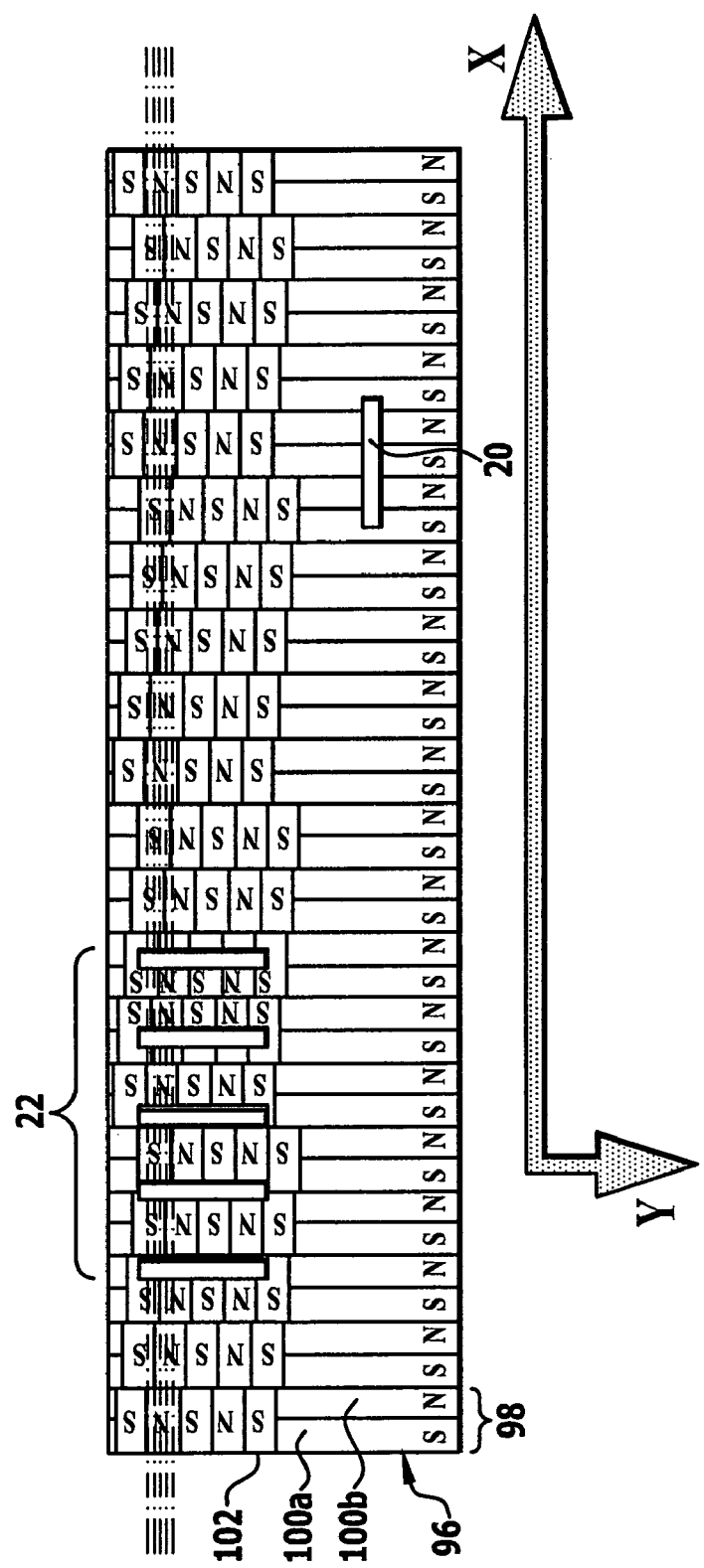
FIG. 7 shows a diagrammatic representation of a sixth exemplary embodiment of a position/displacement measuring system according to the invention.

In a sixth embodiment shown diagrammatically in FIG. 7, a scale body 96 is provided, which comprises strips 98 arranged adjacent to one another in the first direction x, one strip 98 respectively comprising directly adjacent pole fields 100*a*, 100*b* of a region for incremental position determination. These pole fields 100*a*, 100*b* have different positions for different strips 98 in the second direction y, i.e., the positions vary. The magnetic encoding is thereby formed in the second direction y.

The pole fields 100*a*, 100*b* are followed in the second direction y by pole fields 102 with alternating polarity in the second direction y. These pole fields 102 form a region for determination of absolute position. The pole fields 102 can have the same length in the second direction y.

Owing to the different length of the pole fields 100*a*, 100*b* in the second direction y, a strip 98 will possibly be closed off by a region of the pole fields 100*a*, 100*b* at an outer edge.

In the production process, the pole fields 100*a*, 100*b* are produced over the entire extent of the strip 98 in the second direction y. The pole fields 102 are applied in a further procedural step.

The magnetic encoding in the second direction y is achieved by the different position of the pole fields 100*a*, 100*b* in the second direction y and hence the different height offset arrangement (in the second direction y) of the pole fields 102.

In the embodiment shown in FIG. 7, a first sensor device 20, and a second sensor device 22 comprising a plurality of m sensors, which again are spaced in the first direction x, are provided.

Figure 8:
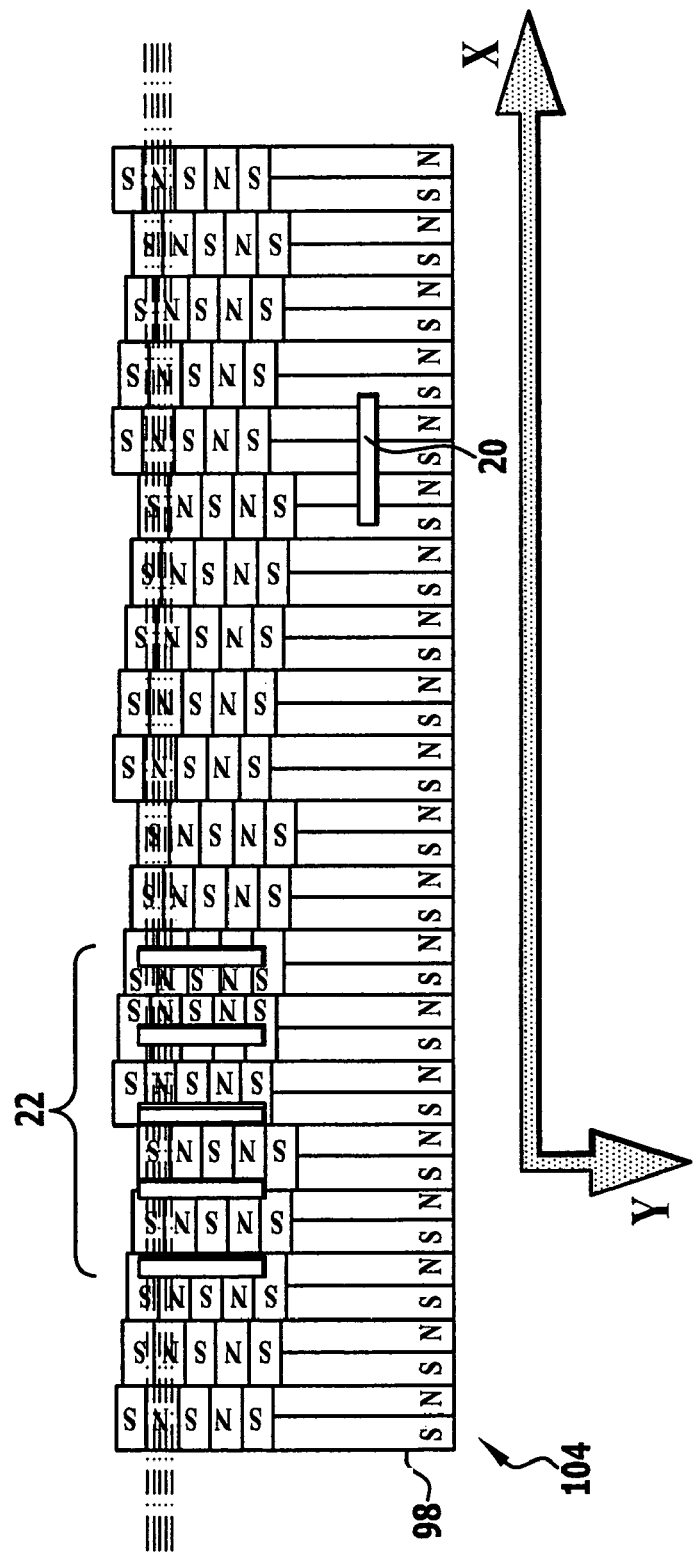
FIG. 8 shows a diagrammatic representation of a seventh exemplary embodiment of a position/displacement measuring system according to the invention.

In a seventh embodiment shown in FIG. 8, a scale body 104 is provided, which is basically identical in design to the scale body 96 according to FIG. 7, with the difference that the respective strips 98 are not closed off at an outer edge by a continuation of the pole fields 100*a*, 100*b*, but by a corresponding end of a respective strip 98 being formed in the second direction y by a last pole field 102.

Figure 9:
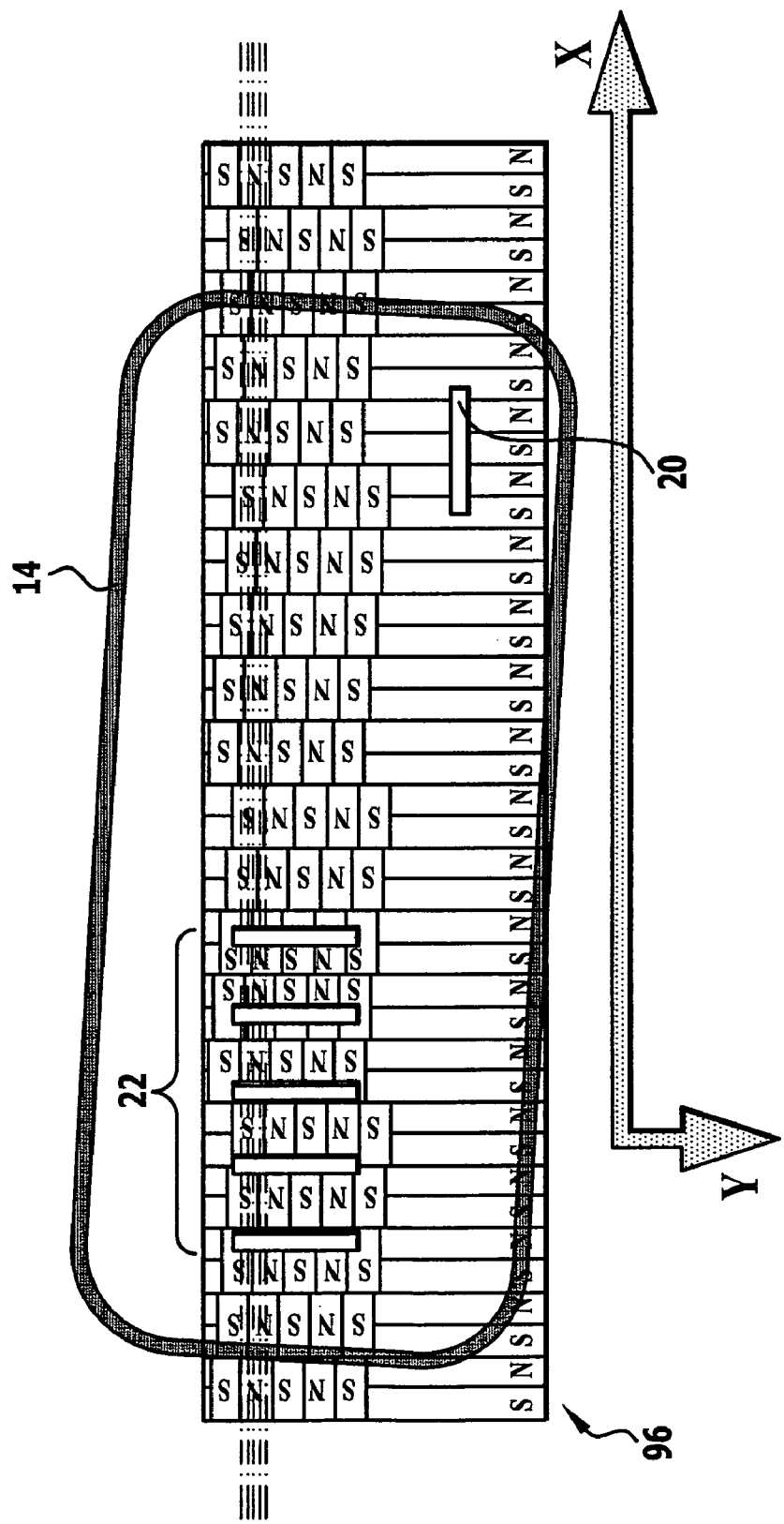
FIG. 9 shows a diagrammatic representation of an eighth exemplary embodiment of a position/displacement measuring system according to the invention.

In FIG. 9 an eighth embodiment is shown, which corresponds to the sixth embodiment.

For example, a pole width of 1 mm in the first direction is provided. An orthogonal offset of 200 μm in each case in the second direction y is thereby achieved. This quantization step can be detected with the sensor device 22. In the measuring direction x the resolution with the corresponding sensor head is 1 μm. A factor 200 forms the reserve for position tolerances when magnetizing in the second direction y and for a linearity error of the second sensor device 22.

A lateral offset of the sensor head 14 can also be detected by means of a scale body 75 with the pole field distribution according to FIG. 5 or a scale body 86 or a scale body 96 or a scale body 104. This is indicated diagrammatically in FIG. 9. From the sensor signals of the orthogonal sensors of the sensor device 22 the evaluation device 36 can recognize whether the sensor head 14 is positioned at an offset in relation to the corresponding scale body, for example, scale body 96. The absolute position can nevertheless be determined by way of the difference in position detected from the individual sensor signals.

It is also possible to detect whether a rotation, as indicated in FIG. 9, about an axis in the third direction z is present.

In a ninth embodiment shown diagrammatically in FIG. 10, a scale body 106 is provided, on which the region for incremental position determination 108 is formed by corresponding pole fields following one another alternately in the first direction x. A region for absolute position determination 110 is formed by pole fields 112, which lie in the second direction y next to the region for incremental position determination 108.

There is associated with the pole fields 112, depending on whether they are of the north pole or south pole type, a digit 0 or 1. Strips are thereby formed, which have a certain sequence of digits in the region for absolute position determination 110 in the second direction y. These digits represent the magnetic encoding, which determines the absolute position.

For example, the digits are encoded in accordance with a Gray code.

The digital code can read at a respective strip in the region for absolute position determination 110 by means of a corresponding second sensor device (not shown in FIG. 10) and hence the absolute position can also be determined.

In the solution according to the invention, there is provided in addition to a magnetic encoding in the first direction x a further magnetic encoding in a second direction y lying transversely thereto. This further magnetic encoding with a variation along the first direction x forms a region for absolute position determination and, in particular, an absolute track. By means of a correspondingly configured second sensor device 22, which has a magnetic field resolution in the second direction y, the absolute position can be determined with a resolution which is prescribed by a width of corresponding pole fields in the region for absolute position determination. The resolution can be improved by a corresponding measurement with interpolation by means of a first sensor device 20 at the region for incremental position determination. The region for absolute position determination and the absolute measurement have little influence on the incremental, exact measurement. The accuracy of the incremental measurement is also maintained for the system measuring in an absolute manner. Absolute determination of the position or displacement of the sensor head 14 in the first direction x is therefore possible with high resolution.

In the above embodiments, the encoding was described as magnetic encoding. Other types of encoding such as, for example, capacitive encoding, inductive encoding or optical encoding are also possible. In principle, it is also possible to provide such different types of encoding on one scale body.

The invention claimed is:
1. Position/displacement measuring system, comprising:
a sensor head; and
an encoded scale body;
   wherein said scale body extends in a first direction and in a second direction lying transversely to the first direction; and
   wherein said scale body has a region for incremental position determination with an encoding in the first direction and a region for absolute position determination with an encoding in the second direction;
   wherein said sensor head has a first sensor device with a sensor resolution parallel to the first direction, which is associated with the region for incremental position determination; and
   wherein said sensor head has a second sensor device with a sensor resolution in a second direction, which is associated with the region for absolute position determination.

2. Position/displacement measuring system in accordance with claim 1, wherein the encoding is at least one of magnetic, inductive, capacitive and optical, and in a corresponding manner the first sensor device and the second sensor device have at least one of a magnetic field resolution, an inductive resolution, a charge resolution and an optical resolution.

3. Position/displacement measuring system in accordance with claim 1, wherein the scale body has pole fields of a first type and a second type for the encoding.

4. Position/displacement measuring system in accordance with claim 1, wherein the sensor head is spaced from the scale body in a third direction lying transversely to the first direction and transversely to the second direction.

5. Position/displacement measuring system in accordance with claim 1, wherein the first direction is a measuring direction for displacement/position determination of the sensor head.

6. Position/displacement measuring system in accordance with claim 1, wherein pole fields of a different type are arranged alternately in the region for incremental position determination.

7. Position/displacement measuring system in accordance with claim 1, wherein the region for absolute position determination and the region for incremental position determination are arranged next to each other or are combined with each other in the second direction.

8. Position/displacement measuring system in accordance with claim 7, wherein pole fields of the region for incremental position determination and pole fields of the region for absolute position determination are arranged next to one another in the second direction.

9. Position/displacement measuring system in accordance with claim 1, wherein one or more pole fields of the region for incremental position determination and one or more pole fields of the region for absolute position determination are arranged in a strip, and the scale body comprises a plurality of strips arranged next to one another in the first direction.

10. Position/displacement measuring system in accordance with claim 9, wherein strip delimiting lines lying opposite one another in the first direction extend parallel to one another.

11. Position/displacement measuring system in accordance with claim 9, wherein a strip comprises a first pole field and a second pole field, with the ratio of the length of the second pole field to the length of the first pole field in the second direction varying for different strips.

12. Position/displacement measuring system in accordance with claim 11, wherein the first pole field and the second pole field are of a different type or are not encoded.

13. Position/displacement measuring system in accordance with claim 11, wherein the different lengths are formed in discrete steps.

14. Position/displacement measuring system in accordance with claim 11, wherein the first pole field, which forms at least partially the region for incremental position determination, has different lengths for different strips.

15. Position/displacement measuring system in accordance with claim 11, wherein the first pole field, which forms the region for incremental position determination, has the same length for all strips.

16. Position/displacement measuring system in accordance with claim 9, wherein a strip has non-encoded regions.

17. Position/displacement measuring system in accordance with claim 16, wherein at least one of the arrangement of the non-encoded regions and the length of the non-encoded regions in the second direction varies for different strips.

18. Position/displacement measuring system in accordance with claim 9, wherein a strip comprises a plurality of pole fields of a different type, and in different strips these pole fields are arranged in different positions in the second direction and these pole fields form at least partially the region for absolute position determination.

19. Position/displacement measuring system in accordance with claim 18, wherein a strip comprises pole fields of a different type, which are arranged one after another in the first direction.

20. Position/displacement measuring system in accordance with claim 1, wherein a digital encoding is formed by the pole fields of the region for absolute position determination by means of distribution of pole fields of the first type and the second type and non-encoded fields.

21. Position/displacement measuring system in accordance with claim 1, wherein the second sensor device is configured such that in the second direction n different steps corresponding to at least one of an arrangement and a distribution of pole fields are recognizable.

22. Position/displacement measuring system in accordance with claim 1, wherein the second sensor device comprises a plurality of sensors.

23. Position/displacement measuring system in accordance with claim 22, wherein in the plurality of sensors, sensors are spaced from one another in the first direction.

24. Position/displacement measuring system in accordance with claim 23, wherein the spacing between adjacent sensors in the first direction is greater or smaller than a pole field width of pole fields in the first direction.

25. Position/displacement measuring system in accordance with claim 21, wherein for the measuring resolution in the second direction, the second sensor device comprises at least one of:
  at least one row of sensors arranged adjacent to one another in the second direction, and
  at least one sensor which determines magnetic field angles, and
  at least one analog displacement/position sensor which determines a displacement or a position in the second direction.

26. Position/displacement measuring system in accordance with claim 1, wherein the first sensor device comprises at least one analog displacement/position sensor for determining a displacement or a position in the first direction.

27. Position/displacement measuring system in accordance with claim 1, wherein a third sensor device is provided, which has a sensor resolution in a third direction transverse to the first direction and transverse to the second direction.

* * * * *